US007365882B2

(12) United States Patent
Curry et al.

(10) Patent No.: US 7,365,882 B2
(45) Date of Patent: Apr. 29, 2008

(54) HALFTONE SCREEN FREQUENCY AND MAGNITUDE ESTIMATION FOR DIGITAL DESCREENING OF DOCUMENTS (75) Inventors: Donald J. Curry, Menlo Park, CA (US); Asghar Nafarieh, Menlo Park, CA (US); Doron Kletter, San Mateo, CA (US)

(73) Assignee: Xerox Corporation, Norwalk, CT (US)

( * ) Notice: Subject to any disclaimer, the term of this patent is extended or adjusted under 35 U.S.C. 154(b) by 650 days.

(21) Appl. No.: 10/776,612

(22) Filed: Feb. 12, 2004

(65) Prior Publication Data
US 2005/0179948 A1 Aug. 18, 2005

(51) Int. Cl.
*H04N 1/405* (2006.01)
(52) U.S. Cl. .................................... 358/3.08; 358/3.07
(58) Field of Classification Search ............... 358/3.07, 358/1.9, 3.06, 3.08, 3.2, 534–536; 345/596–599
See application file for complete search history.

(56) References Cited

U.S. PATENT DOCUMENTS

| 4,849,914 | A |   | 7/1989  | Medioni et al.            |
|-----------|---|---|---------|---------------------------|
| 5,333,064 | A | * | 7/1994  | Seidner et al. ... 358/3.08 |
| 5,515,452 | A |   | 5/1996  | Penkethman et al.         |
| 5,583,659 | A |   | 12/1996 | Lee et al.                |
| 5,745,596 | A |   | 4/1998  | Jefferson                 |
| 5,900,953 | A |   | 5/1999  | Bottou et al.             |
| 6,011,538 | A | * | 1/2000  | Eglit ................. 345/667 |
| 6,058,214 | A |   | 5/2000  | Bottou et al.             |
| 6,229,923 | B1 | * | 5/2001  | Williams et al. ......... 382/224 |
| 6,246,776 | B1 | * | 6/2001  | Merz et al. ............. 382/100 |
| 6,324,305 | B1 |   | 11/2001 | Holladay et al.           |
| 6,343,154 | B1 |   | 1/2002  | Bottou et al.             |
| 6,400,844 | B1 |   | 6/2002  | Fan et al.                |
| 6,633,670 | B1 |   | 10/2003 | Matthews                  |
| 6,734,991 | B1 | * | 5/2004  | Schweid ............... 358/3.06 |

FOREIGN PATENT DOCUMENTS

| EP | 0 712 094 A2  | 5/1996 |
| EP | 1 006 716 A2  | 6/2000 |
| EP | 1 379 074 A2  | 1/2004 |
| EP | 1 380 992 A1  | 1/2004 |

OTHER PUBLICATIONS

R. De Queiroz, "Compression of Compound Documents," *IEEE*, Oct. 1999, pp. 209-213.

(Continued)

*Primary Examiner*—King Y. Poon
*Assistant Examiner*—Nathan K Tyler
(74) *Attorney, Agent, or Firm*—Oliff & Berridge, PLC (57) ABSTRACT A highly efficient method and system for eliminating halftone screens from scanned documents while preserving the quality and sharpness of text and line-art is disclosed. The method and system utilizes a single channel screen frequency estimator module, which generates a screen frequency estimate for image data. The module generates a signal based on the highly filtered image signal at low contrast levels, and based on a reliable estimate to the halftone frequency at higher contrast levels. The single channel screen estimate module has adequate performance in resolution ranges from 300 to 600 dpi.

12 Claims, 7 Drawing Sheets

OTHER PUBLICATIONS

U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/766,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.

* cited by examiner

HALFTONE SCREEN FREQUENCY AND MAGNITUDE ESTIMATION FOR DIGITAL DESCREENING OF DOCUMENTS

CROSS-REFERENCE TO RELATED APPLICATIONS

The present application is related to the following co-pending U.S. applications: Ser. No. 10/776,514 entitled "Systems and Methods for Generating High Compression Image Data Files Having Multiple Foreground Planes"; Ser. No. 10/776,515 entitled "Systems and Methods for Identifying Regions Within an Image Having Similar Continuity Values"; Ser. No. 10/776,608 entitled "Systems and Methods for Connecting Regions of Image Data having Similar Characteristics"; Ser. No. 10/776,602 entitled "Systems and Methods for Organizing Image Data Into Regions"; Ser. No. 10/776,603 entitled "Systems and Methods for Adjusting Image Data to Form Highly Compressible Imaae Planes"; Ser. No. 10/776,620 entitled "Method and Apparatus for Reduced Size Image"; Ser. No. 10/776,509 entitled "Finite Impulse Response Filter Method and Apparatus"; Ser. No. 10/776,508 entitled "Apparatus and Methods for De-Screening Scanned Documents"; and Ser. No. 10/776,516 entitled "Segmentation Method and System for Scanned Documents", all of which were filed concurrently with the present application, are currently pending, and are hereby incorporated by reference in their entireties.

The present application is related to the following co-pending applications: Ser. No. 10/187,499 entitled "Digital De-Screening of Documents", Ser. No. 10/188,026 entitled "Control System for Digital De-Screening of Documents", Ser. No. 10/188,277 entitled "Dynamic Threshold System for Multiple Raster Content (MRC) Representation of Documents", Ser. No. 10/188,157 entitled "Separation System for Multiple Raster Content (MRC) Representation of Documents", and Ser. No. 60/393,244 entitled "Segmentation Technique for Multiple Raster Content (MRC) TIFF and PDF all filed on Jul. 01, 2002 and all commonly assigned to the present assignee, the contents of which are herein incorporated by reference.

BACKGROUND OF THE INVENTION

1. Field of Invention

The present invention relates generally to methods and systems for image processing, and more particularly to methods and systems for de-Screening digitally scanned documents.

2. Description of Related Art

Almost all printed matter, except silver-halide photography, is printed using halftone screens. The need to estimate the halftone frequency and magnitude stems from the fact that almost all printed matter, with the exception of a few devices like dye-sublimation or silver-halide photography, is printed out using halftone screens. These halftones are very specific to the printing device and when scanned and re-halftoned may cause visible artifacts and/or unacceptable Moiré patterns if not properly removed. The suppression of halftones is especially important for color documents, since these are typically printed with four or more color separations containing slightly different screens at different angles and or frequencies, and these may interact with each other to cause undesirable spatial artifacts.

The successful removal of the original halftone screens is based on the ability to accurately estimate the local frequency. Therefore there is a need for an improved method and apparatus for estimating the halftone screen frequency and magnitude.

SUMMARY OF THE INVENTION

A highly efficient method and system for eliminating halftone screens from scanned documents while preserving the quality and sharpness of text and line-art is disclosed.

A screen estimate module is disclosed, which uses only a single channel of image data processing to generate a screen frequency estimate for downstream image processing, particularly for de-screening of the halftone signals from the image.

Although using only one channel, the screen estimate module can generate a high quality and reliable estimate of the halftone screen frequency. A single channel screen frequency estimate is sufficient, because when the contrast is low or near zero, the frequency estimate is based on a highly filtered image signal, and may not be an accurate frequency measurement. However, when it is low, minimal halftone noise is measured in the input image and knowledge of its precise frequency is not required by downstream processing. A wide range of edge-sharpening effects may be applied to the image data in this situation, without exacerbating undesirable halftone artifacts. When the contrast is higher, the frequency estimate is based on a reliable measurement of the halftone frequencies occurring in the image. Therefore, a single channel screen frequency estimate can be used over the full range of image contrast.

Because only a single channel is used, significant savings in terms of cost, power and device package size can accrue from practicing the invention. The regime in which this invention is particularly effective is in the range of resolutions of 300 to 600 dpi.

BRIEF DESCRIPTION OF THE DRAWINGS

The features and advantages of the present invention will become apparent from the following detailed description of the present invention in which.

DETAILED DESCRIPTION OF PREFERRED EMBODIMENTS

Figure 1:
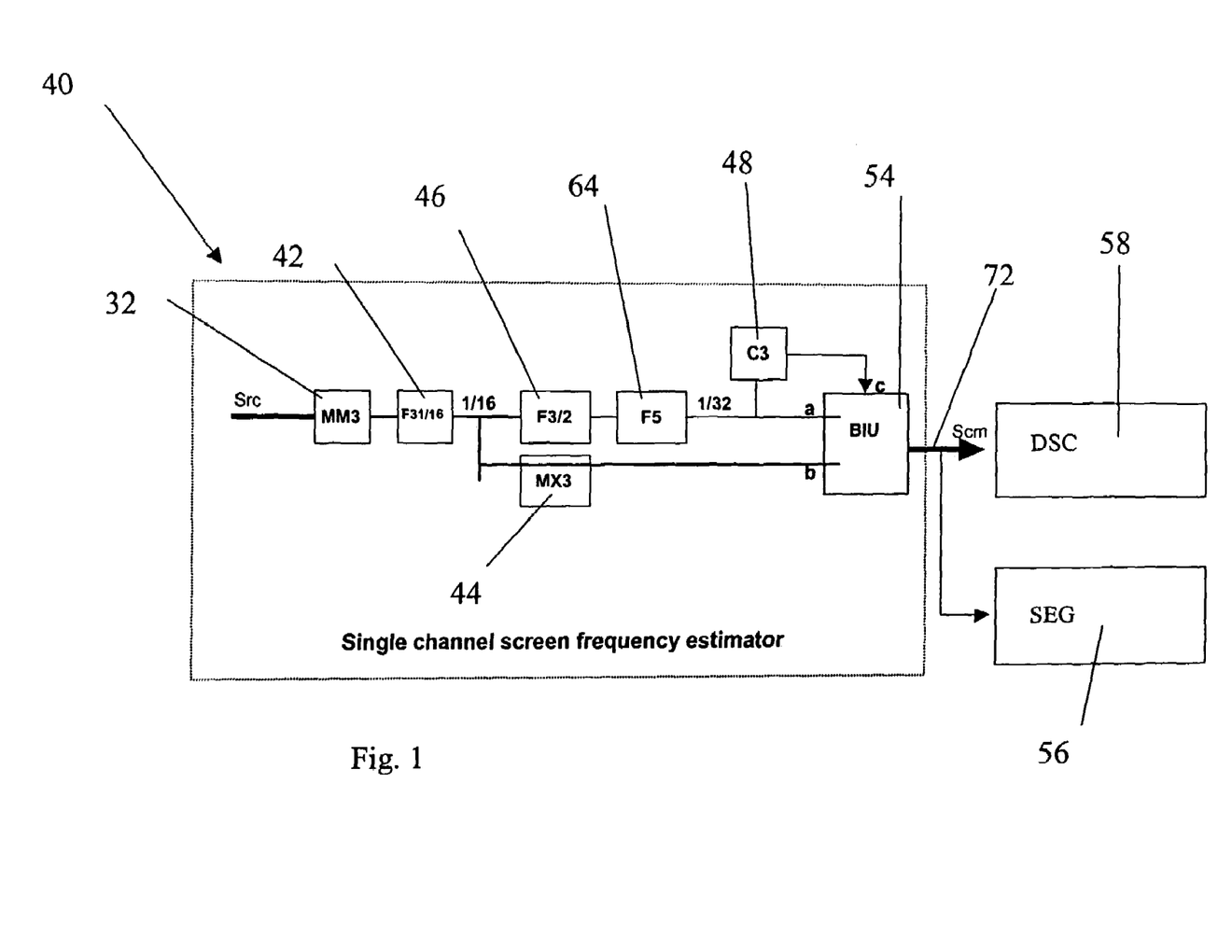
FIG. 1 is a block diagram of the system of a single channel screen estimator module.

A new method and system are described for de-Screening digitally scanned documents such that potential halftone interference and objectionable Moiré patterns are eliminated or substantially reduced. Referring now to FIG. 1, a block diagram of the method and system of the present invention is represented by a single channel screen estimator module SEM 40. The screen estimator module 40 is responsible for estimating the instantaneous halftone frequency at the current pixel of interest. The screen-estimator module 40 operates on an 8-bit source image Src 28, and produces an 8-bit halftone frequency estimate Scm 72.

The need to estimate the halftone frequency and magnitude stems from the fact that almost all printed matter, with the exception of a few devices like dye-sublimation or silver-halide photography, is printed out using halftone screens. These halftones are very specific to the printing device and, when scanned and re-halftoned for printing may cause visible artifacts and/or unacceptable Moiré patterns if not properly removed. A de-screen module (DSC) as described in Applicant's co-pending application, Ser. No. 10/776,508 relies on the information that is produced by the screen estimator module in order to eliminate (filter out) the original halftone patterns from the original scanned image. The suppression of halftones is especially important for color documents, since these are typically printed with four or more color separations containing slightly different screens at different angles and or frequencies, and these may interact with each other to cause undesirable spatial artifacts.

The prior art screen estimator module used up to three frequency channels at different levels of sensitivities. An upper channel was tuned for maximum frequency sensitivity at the full source resolution and therefore is used for deriving the screen frequency estimate signal. However, this channel was very sensitive and would usually report the existence of frequencies even when the screen is very weak. Therefore the screen frequency was additionally qualified by a screen magnitude Scm 72.

The single channel 40 in FIG. 1 is tuned for moderate frequency sensitivity and operates at the full source resolution. The screen frequency signal Scm 72 is derived from the analysis of the frequency estimate that is produced by the single channel.

The single channel 40 is made up of a Min-Max texture detector MM3 32 to be described below, followed by an averaging filter 42. The single channel MM3 32 unit operates on the single channel 8 bit incoming source signal Src 28. The MM3 Min-Max module 32 is used for finding peaks and valleys in the 2D input signal. A detailed description of the Min-Max detector unit is given below. The unit is basically examining the content of a 3×3 window centered on the current pixel of interest and analyzing, using adaptive thresholding, if the center pixel is significantly larger or smaller relative to its eight surrounding neighbors. If so, the center pixel is regarded to be a peak (if larger) or valley (if smaller) respectively. By counting the number of peaks and valleys per unit area, a measure of the local frequency is obtained.

The MM3 unit output 32 has only 1 bit of precision, but is scaled by a configuration factor DotGain prior to the first subsequent stage of filtering. The unit operates on one or more color channels of the input signal. However, in this embodiment only one channel, the luminance channel is used. Note the scaling of the filter output can be postponed to the normalization step of the first subsequent filter by adjusting that stage's normalization factor.

The output from the MM3 Min-Max detector 32 is passed through different averaging and sub-sampling filters. In order to avoid aliasing problems with the sub-sampling, the spatial filter span in each case is twice the sub-sampling ratio minus one.

Likewise, the single channel MM3 32 output is applied to a cascade of two triangular 2D subsampling filters—the F31/16 filter 42 and F3/2 filter 46. The output from the cascaded filtering units is sub-sampled by a factor of 32× in each direction (16× in the first filter and 2× in the second).

In the single channel 40, a sample of the 1/16 resolution signal is passed to MX3 unit 44. This unit performs a 3×3 Max operation (gray dilation). The output is sent to the b input of the Bilinear Interpolation unit BIU 54, respectively.

The single channel contains an additional smoothing/averaging F5 unit 64 stage to further reduce spatial noise. The F5 unit 64 is a 5×5 triangular weight (non-subsampling) filter. The filtered output from this unit is sent to the input of the Bilinear Interpolation units BIU 54. The output is also passed through the C3 contrast unit 48 which searches for the maximum difference in a 3×3 window centered on the current pixel. The C3 output becomes the c input to the BIU unit 54.

The three signals produced by the single channel 40 are sent to the BIU unit 54. This unit performs bilinear interpolation to bring the sub-sampled input resolution back to the original source resolution. The a and c BIU inputs are at 1/32 resolution and the b inputs are at 1/16 resolution. The output bandwidth from the interpolation unit is substantially higher than the input. For example, with the factor of 32× above, the interpolation unit produces 1024 output pixels for each input pixel.

The output of the Bilinear Interpolation Unit 54 is the 8-bit estimated screen magnitude signal Scm 72. The estimated screen frequency signal Scm 72 is exported to the De-Screen Module DSC 58 and to the Segmentation Module SEG 56. A more detailed description of the various elements of the single channel screen estimator module 40 is provided below.

Figure 2:
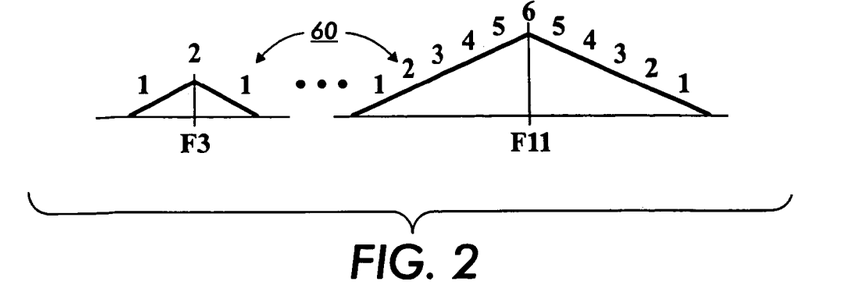
FIG. 2 illustrates one-dimensional filter responses of various filter units.
Figure 3:
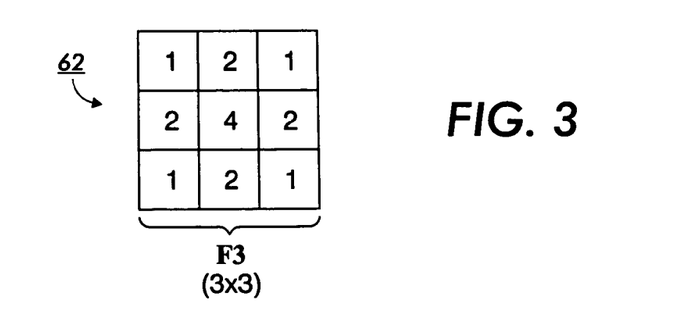
FIGS. 3-5 illustrates two-dimensional filter responses of various units.
Figure 4:
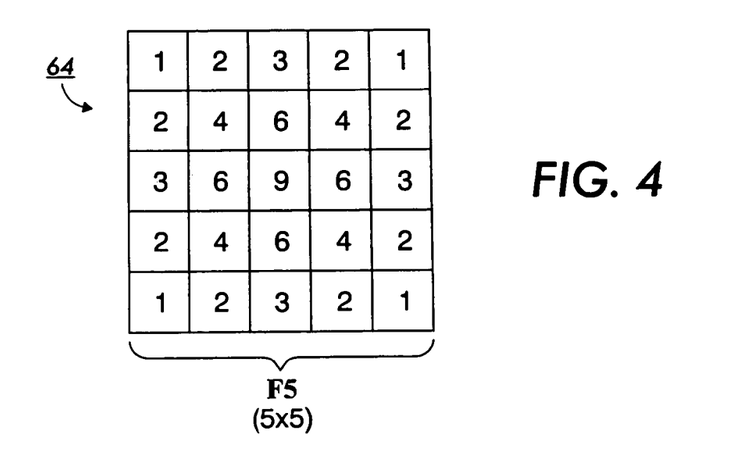
Figure 5:
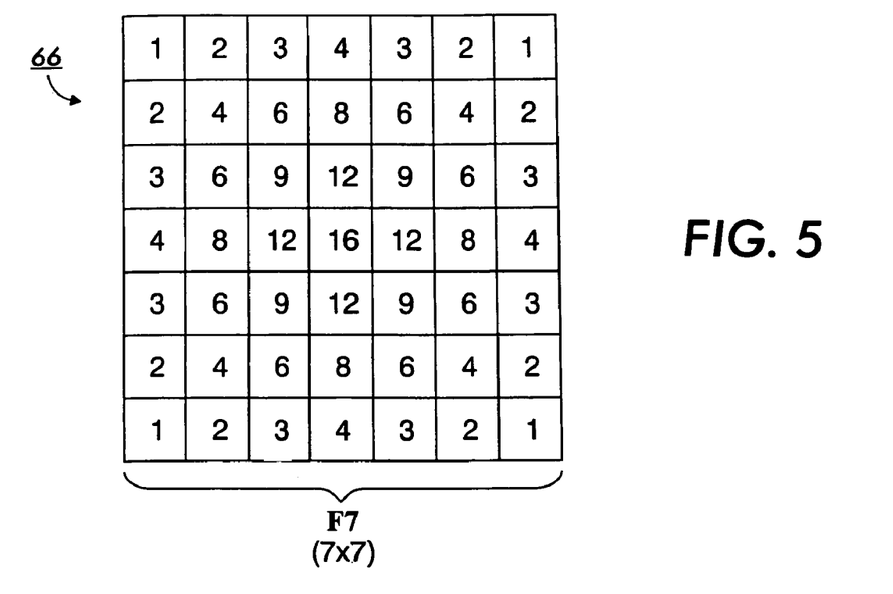

FIG. 2 illustrates one-dimensional filter responses of various filter units and FIGS. 3-5 illustrates two-dimensional filter responses of various units. These Filtering Units are used for the purpose of smoothing or averaging the input signals to remove high frequencies. Each filter unit implements a square, separable and symmetric 2D FIR (Finite impulse response) filter. The filter response is identical in the horizontal and vertical directions. If the input to the filter is a color signal, the same filter response is independently applied on each one of the color components. The 1D filter 60 response has a symmetric triangular shape with integer coefficients as illustrated in FIG. 2. The particular filter shape (but any other filter shapes are covered) was chosen for ease of implementation.

The general filter form is referred to as an Fn/k filter, where n is the filter size (overall span in either x or y) and k is the amount of sub-sampling that is applied to the filtered output in each direction. The sub-sampling factor k is omitted when k=1. Note that in this document the filter span n is assumed to be an odd integer (n=1, 3, 5, . . . ) such that the 2D filter response has a definite peak at the valid center pixel location.

Examples for the 1D and 2D filter response are illustrated in FIGS. 1 and 2. FIG. 2 shows the non-normalized ID filter 60 response for F3 and F11, and FIGS. 3 through 5 shows the resulting non-normalized 2-D coefficients for F3 62, F5 64, and F7 66, respectively.

Since the filter is separable, the 2D filter response can be implemented by cascading two 1D filters in the horizontal and vertical directions. The filters are all operating at the full input data rate, but the output may be sub-sampled by a factor of k in each direction. In many cases, although not always, the filter size n and the sub-sampling factor k satisfy the following relationship:

$$n = 2 \cdot k - 1$$

This represents 50% coverage overlap relative to the sub-sampled area. As an example, the overall 2-D response of the smallest 3×3 filter, F3 62, is:

$$F\_3 = \frac{1}{16}\begin{bmatrix}1\\2\\1\end{bmatrix} * (1, 2, 1) = \frac{1}{16}\begin{bmatrix}1 & 2 & 1\\2 & 4 & 2\\1 & 2 & 2\end{bmatrix}$$

Larger filters are similarly described. Since these filters are separable, it is best to implement them in two 1D steps, orthogonal to each other. Each filter output is normalized by the sum of the coefficients to make it fit back into the 8-bit range. Some filters, such as an F3 filter 62, have a total sum of weights that is a power of 2 numbers. These filters will require no division in the normalization step as it can simply be implemented as a rounding right shift of 2. For example, the F3 filter 62 has a total 1D weight of 1+2+1=4. A rounded division by this weight could be accomplished with an add of 2 followed by a shift right by 2.

normalizedResult=(sum+2)>>2

In general, when rounding is called for, it is typically applied by adding in half the divisor prior to performing the shift. Since right shift, performed on 2's complement coded binary numbers is the equivalent of floor (numerator/2^shift), adding half the divisor causes nearest integer rounding for both signed and unsigned numerators.

When the total weight of a filter does not add up to a power of 2, the compute-intensive division operation is avoided by approximating it using a multiplication by ratio of two numbers, where the denominator is a chosen power-of-2 number.

The subsampling filters F3/2 F15/8 F31/16 and F63/32 all have power of 2 1D weights: 4,64,256 and 1024 respectively. So normalization is just a rounding right shift. The F5 filter 64 has a 1D weight of 9 and can be approximated by multiplication by 57 prior to a rounding right shift by 9 positions. Note that multiplication of x by 57 can be done without using a variable multiply by using shift/add/sub operations such as:

x*57=x<<6−x<<3+x

Figure 6A:
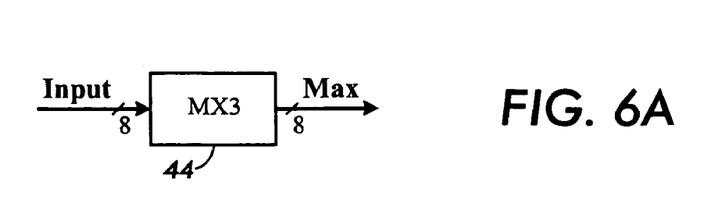
FIGS. 6A and 6B illustrates a typical 3×3 max module structure.
Figure 6B:
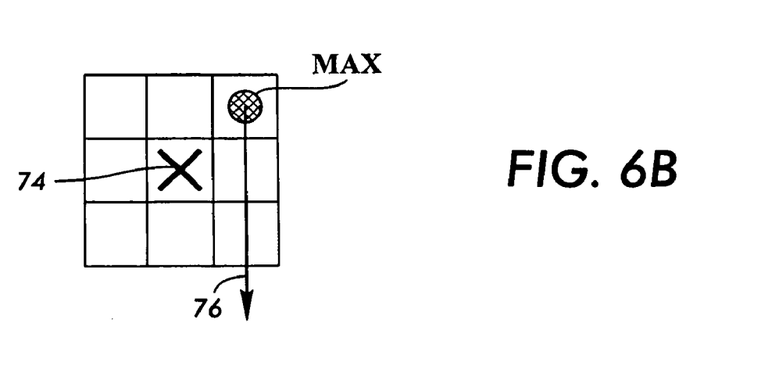

Referring to FIGS. 6A and 6B, the MX3 Max unit 32 used in the single channel searches for the maximum value in a 3×3 window centered on the current pixel 74 of interest. The input is an 8-bit signal. The search for the max value is performed over the 9 pixels of the 3×3 window. This gray dilation module produces an 8-bit output that is made up of the largest pixel value 76 found within the boundaries of the search window. The MX3 max algorithm is illustrated in FIG. 6B.

Figure 7A:
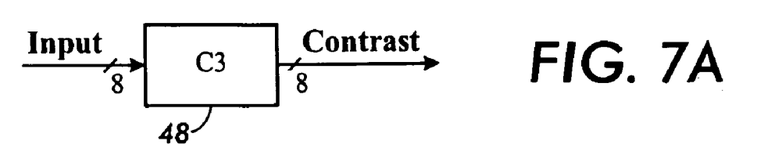
FIGS. 7A and 7B illustrates a typical 3×3 contrast module structure.
Figure 7B:
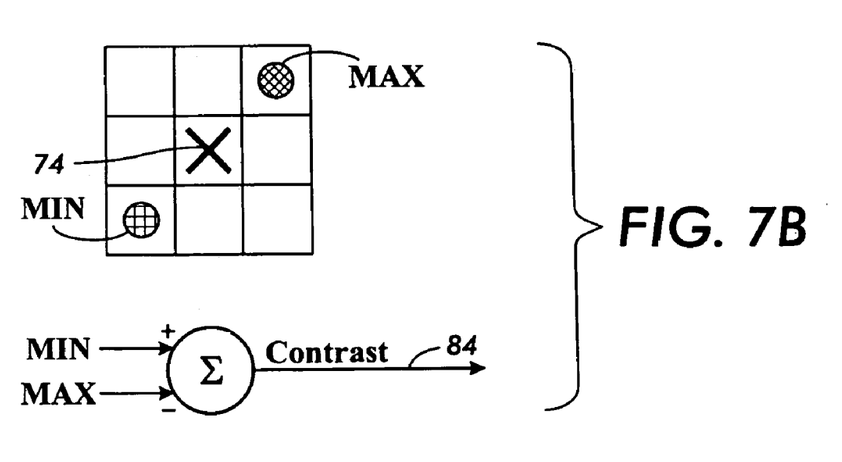

Referring now to FIGS. 7A and 7B, these C3 Contrast module 48 is designed for measuring the amount of local contrast at the input. The contrast is defined as the difference between the largest and smallest pixel values within a window centered on the current pixel 74 of interest. The C3 Contrast unit 48 utilizes a window size of 3×3, centered on the current pixel 74 of interest. The input to the contrast units is an 8-bit signal. The contrast module 48 produces an 8-bit monochrome output (single channel) 84. The operation of the C3 Contrast Unit 48 is illustrated in FIG. 7B. The operation is as following: for each pixel location, the content of a 3×3 window is independently searched for the minimum and maximum pixel values. The output contrast value is defined to be:

Contrast=max−min

Since the largest and smallest pixel values are always between 0 and 255 for an unsigned 8-bit input signal, the contrast is guaranteed to be in the range [0 . . . 255], and no special normalization is necessary.

The Min-Max Detection module 32 is used for finding peaks and valleys in the input signal. By counting the number of peaks and valleys per unit area, a measure of the local frequency is obtained.

The MM3 unit 32 operates on a one component gray source. The unit utilizes 3×3 window to indicate when the center pixel is at an extreme value (either peak or valley) relative to its 8 neighbors, following the logic below. The output from the Min-Max Detection unit 32 is a 1-bit signal indicating that the corresponding Src pixel is in an extreme value state (can be extended to other color channels as well).

Figure 8:
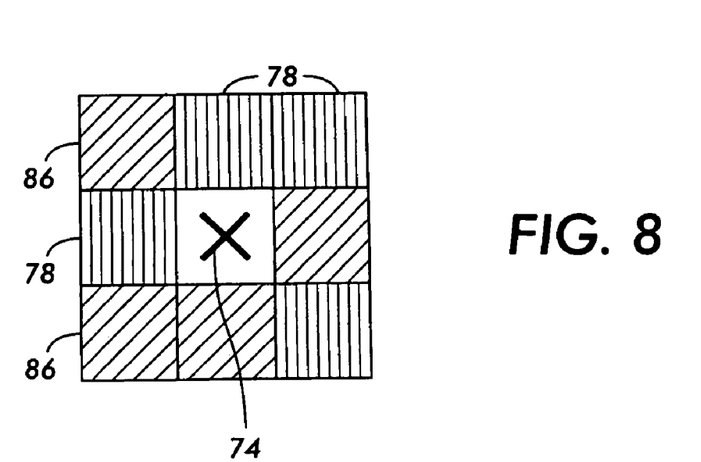
FIG. 8 shows a min-max detection structure within a 3×3 window.
Figure 9A:
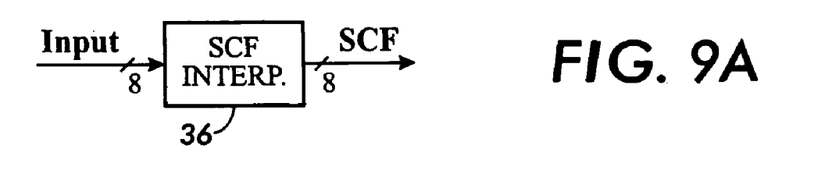
FIGS. 9A. and 9B illustrates a single interpolation unit.
Figure 9B:
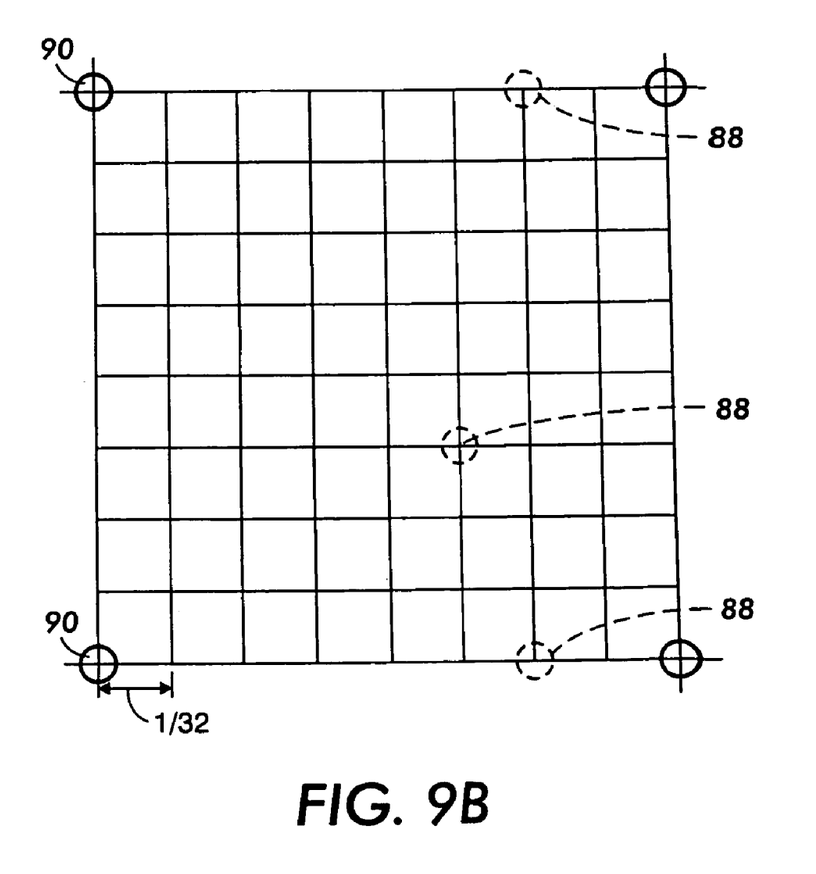

The MM3 Min-Max Detection structure is depicted in FIG. 8. For each pixel, the outer ring of 8 pixels surrounding it (the current pixel of interest) is first analyzed. The 8 outer pixels are further divided into two sets of 4 pixels each as shown in FIG. 8. The partitioning of the outer ring into two sets is useful for reducing the likelihood of false alarms in detecting straight-line segments as halftones (since most commonly encountered halftones are likely to be clustered dots).

For each set, the pixel values are compared among the members 78 and 86 of the set to determine the minimum and maximum values within each set independently:

$A_{max}$=max ($Aij$); over all ($i,j$) belonging to the set $A$ $A_{min}$=min ($Aij$); over all ($i,j$) belonging to the set $A$ $B_{max}$=max ($Bij$); over all ($i,j$) belonging to the set $B$ $B_{min}$=min ($Bij$); over all ($i,j$) belonging to the set $B$ From these, the overall outer ring and total min are computed. Using the total min and 2 configuration parameters, a noise level is then computed.

Noise=*ConThr*+*X*\**NoiseFac*/256

The center pixel 74 value X is defined to be at a peak if it is [significantly] larger than the maximum pixel value of either set:

If [($A_{max}$+Noise<X) AND ($B_{max}$≦X)] return(1)

Similarly, the center pixel 74 value X is defined to be at a valley if it is [significantly] smaller than the minimum pixel value from either set:

If [($A_{min}$>X+Noise) AND ($B_{min}$≧X)] return(1)

The above equations determine the two conditions where the output from the 3×3 detection window are set to 1; in all other cases the output will be set to 0.

The single channel screen estimator module SEM makes use of a Bilinear Interpolation Unit BIU. The Bilinear Interpolation Unit interpolates (up-samples) the signal back to the source resolution. The input signals are up-sampled by a factor of 32 in each direction to restore it to the original resolution. Each interpolation unit is performing bilinear interpolation, essentially generating 32*32=1024 pixels for each original pixel. The step size of the bilinear interpolation is $\frac{1}{32}^{nd}$ of the original pixel grid. The following paragraphs describe in more details Bilinear Interpolation Unit.

Figure 10:
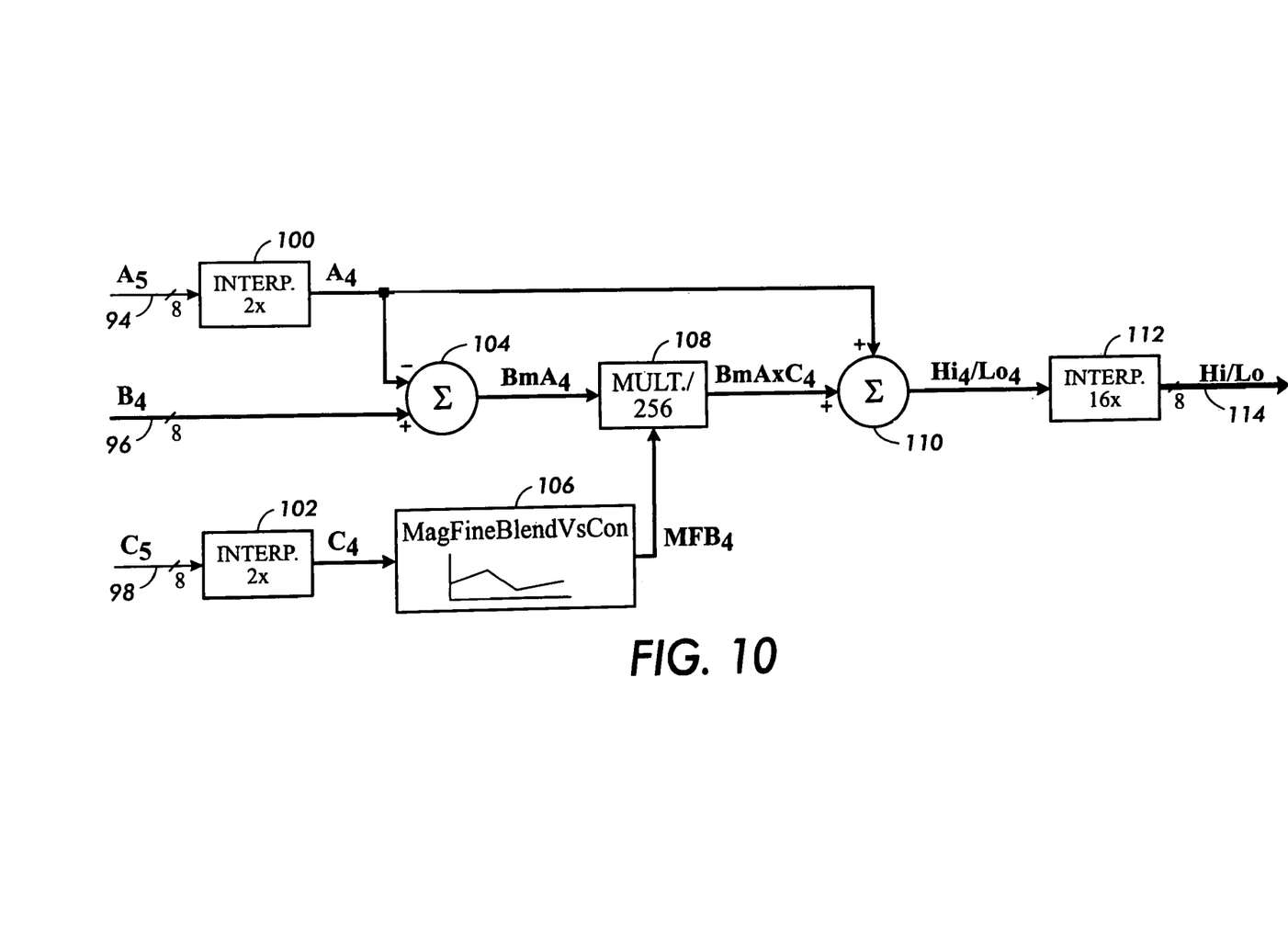
FIG. 10 is a block diagram of a structure of a Bilinear Interpolation unit.
Figure 11:
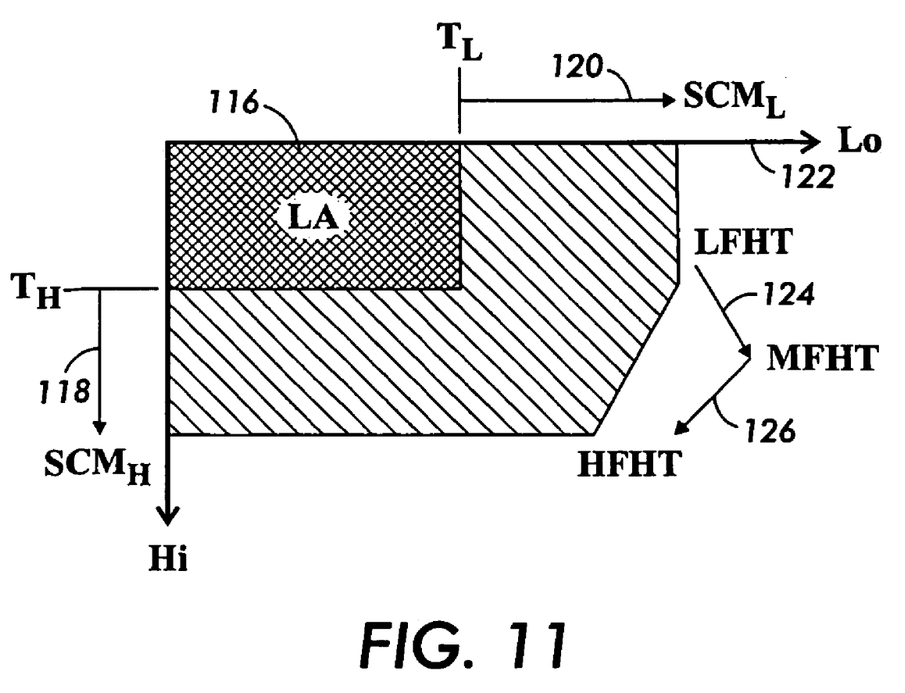
FIG. 11 illustrates a screen frequency estimation equation.

The structure of one of the Bilinear Interpolation Unit BIU 54 is shown in FIG. 10. The Bilinear Interpolation Unit operates on 3 signals 94, 96 and 98 generated in the single channel 40.

As can be seen in FIG. 10, the Bilinear Interpolation Unit 54 is composed of two interpolation stages 100 and 102, respectively. The first stage includes the interpolation 100 of the $A_5$ 94 and $C_5$ 98 inputs by 2× in each direction. The interpolation 100 uses a simple bi-linear interpolation technique. The $A_5$ input 94 corresponds to the output of the F5 filter 64 units. Note the subscripts in FIG. 10 correspond to the level of subsampling. The subscript 5 indicates that the signal has been subsampled 5 times by a factor of ½ (1/32 total). The $C_5$ input 98 corresponds to the output of the 3×3 contrast units. As indicated in FIG. 1, both of these inputs have been previously sub-sampled by a factor of 32× in each direction. After interpolating the $A_4$ and $C_4$ outputs, of this first stage of interpolation are subsampled by 1/16. That is the same subsampling level of the $B_4$ input 96. It is now possible to compute $BmA_4$, the $B_4$ minus $A_4$ difference signal 104. $BmA_3$ is multiplied by the magnitude fine blend factor $MFB_3$ that is generated by applying $C_4$ to the MagFineBlenVsCon function 106. The $BmAxC_4$ signal is the result of multiplying 108 $BmA_4$ times $MFB_4$ and shifting right by 8. This gets added to $A_4$ in 110 to create $HI_4$ or $LO_4$ signals depending on the channel. The results are then fed to the 16× bilinear interpolation unit 112 producing the Lo or Hi output depending on the channel.

The MagFineBlenVsCon function 106 above is a programmable function. In one embodiment, the typical Mag-FineBlenVsCon function 106 above can be easily computed as y=(x−16)*12 where the output is then clamped between 0 and 192. The equations below incorporate this typical configuration value of MagFineBlenVsCon 106.

$$BmA_4 = B_4 - A_4$$

$$MFB_4 = \text{MagFineBlend}VsCn3(C_4) = \max(0, \min(192, (C_4-16)*12))$$

$$BmAxC_4 = (BmA_4 * MFB_4) >> 8$$

The functional relationship defined above for $MFB_4$ is helpful in insuring the successful operation of the single channel 40. The relationship defines a linear curve starting at 16, with a slope of 12, and cutting off to zero at 192. This relationship insures that the control signal adjusts the blend of a and b, such that as the contrast increases, the proportion of B which is derived from the MX3 44 and is therefore a measure of the frequency occurring within a 3×3 pixel window, also increases.

If the contrast is very low, the Bilinear Interpolation module outputs a signal based on the A input, which is the heavily filtered image signal. If the contrast is larger, the output signal is more weighted toward the B component, which is the frequency measurement. Therefore, the output signal Scm can be used alone, without the additional magnitude estimate, because when it is small, it indicates that a relatively small amount of halftone noise is present and a precise measurement of its frequency will not be needed by downstream processing. However, when it is larger, it is based primarily on the frequency measurement, and so it is a reliable estimate of the halftone frequency present in the image.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A single channel method for estimating a halftone screen frequency from image data, comprising:
   multiplying a frequency measurement signal by a factor;
   adding the multiplied frequency measurement signal to an image data signal to produce an output signal;
   adjusting the factor multiplied to the frequency measurement signal based on a control signal, wherein the control signal is based on a characteristic of the image data;
   interpolating the output signal to produce the halftone screen frequency estimate; and
   subtracting a frequency signal from the image data signal, to produce the frequency measurement signal.

2. The method of claim 1, further comprising:
   measuring a contrast within a window of the image data to produce the control signal.

3. The method of claim 1, further comprising:
   filtering the image data using a low-pass filter to produce the image data signal.

4. The method of claim 1, further comprising:
   sub-sampling the image data to produce the image data signal.

5. The method of claim 1, further comprising:
   outputting the output signal which is an estimate of the halftone screen frequency, to a de-screening device.

6. An apparatus for estimating a halftone screen frequency, comprising:
   a multiplier which multiplies a frequency measurement signal by a factor;
   a combiner which combines the multiplied frequency measurement signal with an image data signal to produce an output signal;
   an adjuster which adjusts the factor multiplied to the frequency measurement signal based on a control signal, wherein the control signal is based on a characteristic of the image data; and
   an interpolator for interpolating the output signal to produce the halftone screen frequency estimate; and
   a subtracting module for subtracting a frequency measurement from the image data signal, to produce the frequency measurement signal.

7. The apparatus of claim 6, further comprising:
   a contrast measuring device which measures contrast within a window of the image data to produce the control signal.

8. The apparatus of claim 6, further comprising:
   a low-pass filter for filtering the image data to produce the image data signal.

9. The apparatus of claim 6, further comprising:
   a sub-sampling filter for sub-sampling the image data to produce the image data signal.

10. The apparatus of claim 6, further comprising:
    an output device for outputting to a de-screening device the output signal which is an estimate of the halftone screen frequency.

11. A single channel apparatus for estimating a halftone screen frequency, comprising:
- means for measuring a contrast of image data;
- means for adjusting a factor multiplied to a frequency measurement signal based on the measured contrast;
- means for combining the multiplied frequency measurement signal with an image data signal to produce an output signal;
- means for interpolating the halftone screen frequency; and
- means for subtracting a frequency measurement from the image data signal, to produce the frequency measurement signal.

12. A tangible computer-readable medium that stores computer-executable instruction which, when executed by a computer, causes the computer to perform the method of claim 1.

* * * * *